United States Patent [19]

Losch

[11] 4,308,665
[45] Jan. 5, 1982

[54] DISTANCE MEASURING DEVICE

[76] Inventor: Eugene R. Losch, 855 Hickory Ave. S.E., Palm Bay, Fla. 32905

[21] Appl. No.: 122,676

[22] Filed: Feb. 19, 1980

[51] Int. Cl.³ .............................................. G01B 3/12
[52] U.S. Cl. .................................................. 33/141 E
[58] Field of Search .............. 33/141 R, 141 E, 141.5, 33/142, 129

[56] References Cited

U.S. PATENT DOCUMENTS

| | | | |
|---|---|---|---|
| 2,716,819 | 9/1955 | Staples | 33/141 E |
| 3,732,625 | 5/1973 | Vernooy | 33/141.5 |
| 4,176,458 | 12/1979 | Dunn | 33/141 E |

Primary Examiner—Harry N. Haroian
Attorney, Agent, or Firm—Newton, Hopkins & Ormsby

[57] ABSTRACT

A manual or vehicle propelled rolling distance measuring unit has a folding frame and support stand and is equipped on the handle portion of the frame with an electrically operated digital counter which responds to the rotary movement of wheel-mounted permanent magnets relative to a stationary magnetic switch. A rotational magnet shield is magnetically driven in one direction by a permanent magnet to a switch shielding position to prevent operation of the digital counter when the measuring device rolls in a reverse direction. The device can be used to establish the distance between poles in a cable television system.

4 Claims, 7 Drawing Figures

U.S. Patent   Jan. 5, 1982   Sheet 1 of 2   4,308,665
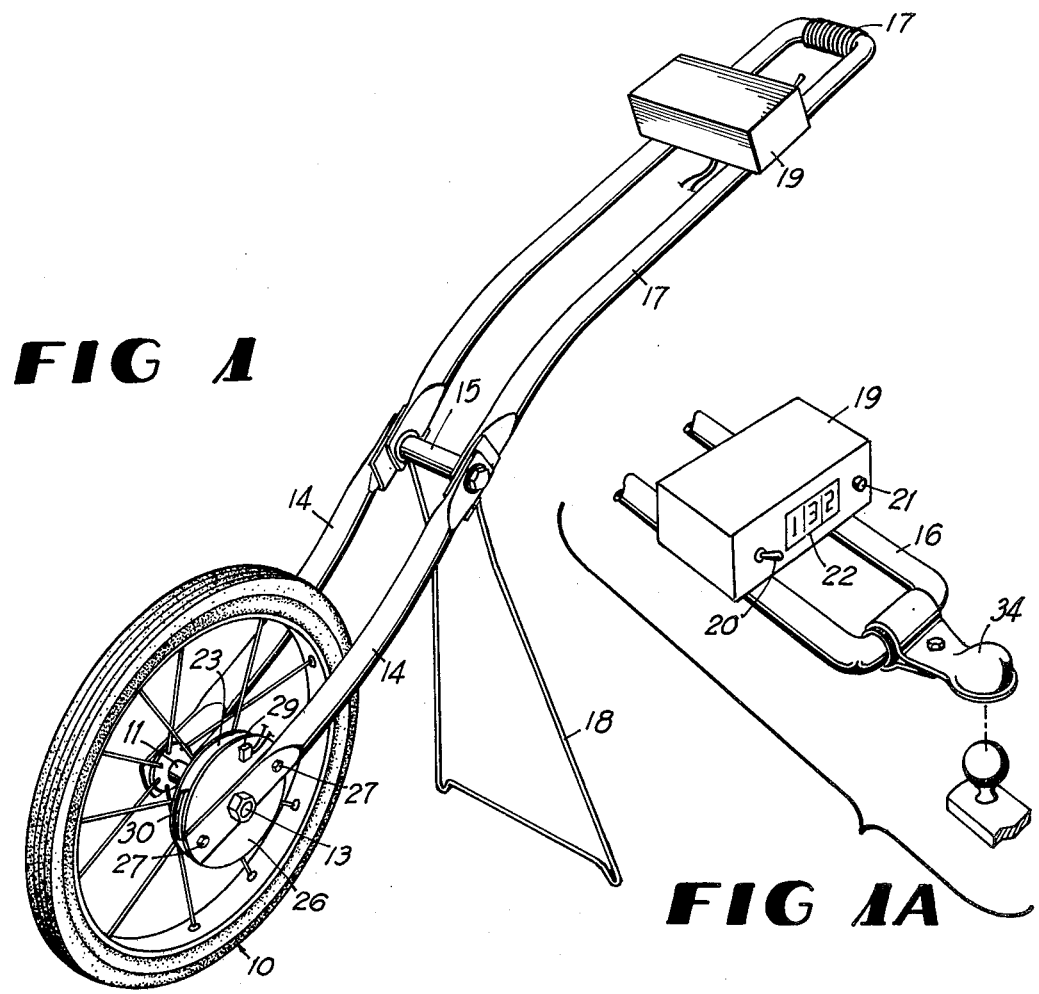
FIG 1
FIG 1A
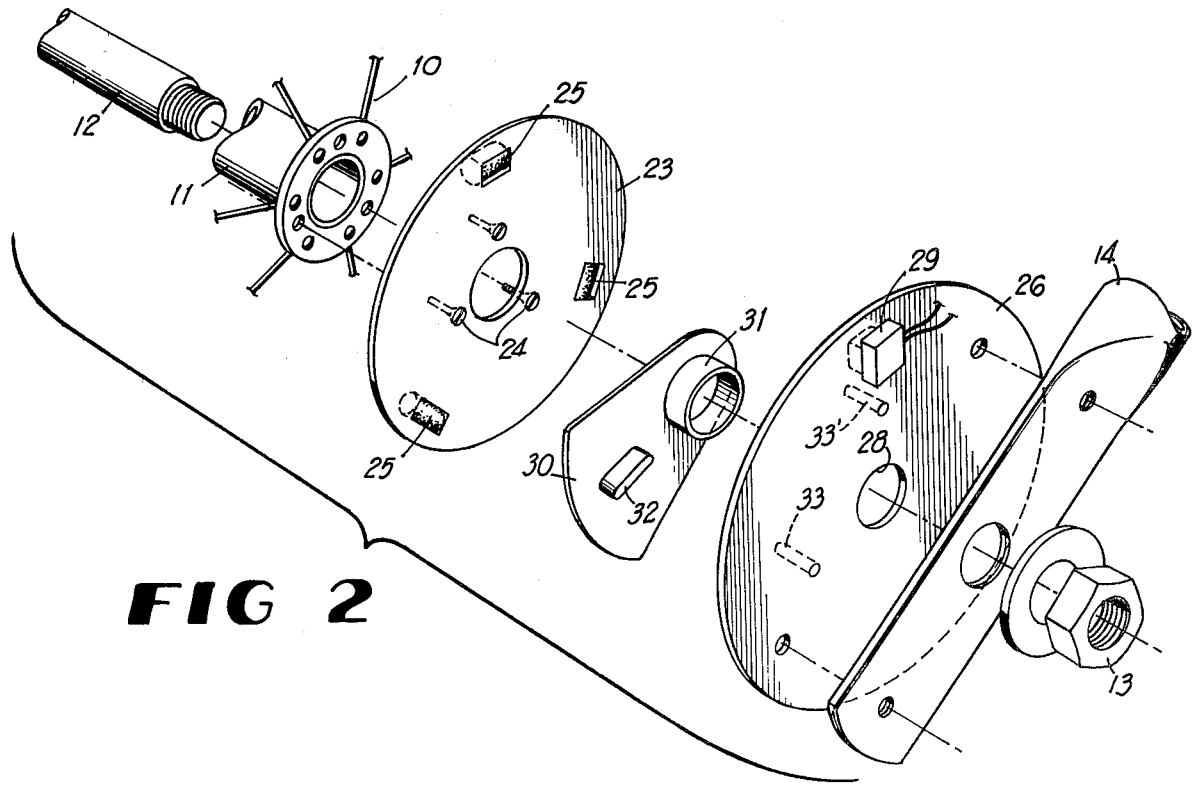
FIG 2

DISTANCE MEASURING DEVICE

BACKGROUND OF THE INVENTION

Rolling wheel distance measuring devices including devices which employ some form of digital counter are known in the prior art. Ordinarily, in the prior art, the counter mechanism is mechanically operated in response to the rotation of a measuring wheel having a known circumference. These mechanical devices vary considerably in their complexity and some are quite complex and costly.

The present invention seeks to improve on the known prior art by providing a rolling wheel measuring device having an electrically operated counter which responds to the activation of a relatively stationary magnetic switch on the device which is positioned to be cyclically operated by the movement of permanent magnets arranged in predetermined spaced relationship on a rotating carrier attached to the wheel. The cost and relative complexity of mechanical means for activating a counter are dispensed with.

A significant feature of the invention resides in the placement between the magnetic switch and rotating magnets of a shield formed of magnetically attractable material. In a forward mode of operation of the device, the shield assumes a non-active position away from the switch, but in a reverse mode of operation, the shield is magnetically turned to a switch-shielding position in relation to the rotating magnets so that the switch cannot activate the digital counter.

BRIEF DESCRIPTION OF THE DRAWINGS

FIG. 1 is a perspective view of a distance measuring device according to the invention in an erected use mode.

FIG. 1A is a fragmentary perspective view of a handle-mounted digital counter and an optional vehicular towing hitch for the device.

FIG. 2 is a fragmentary exploded perspective view of a hub assembly.

DETAILED DESCRIPTION

Figures 5, 6:
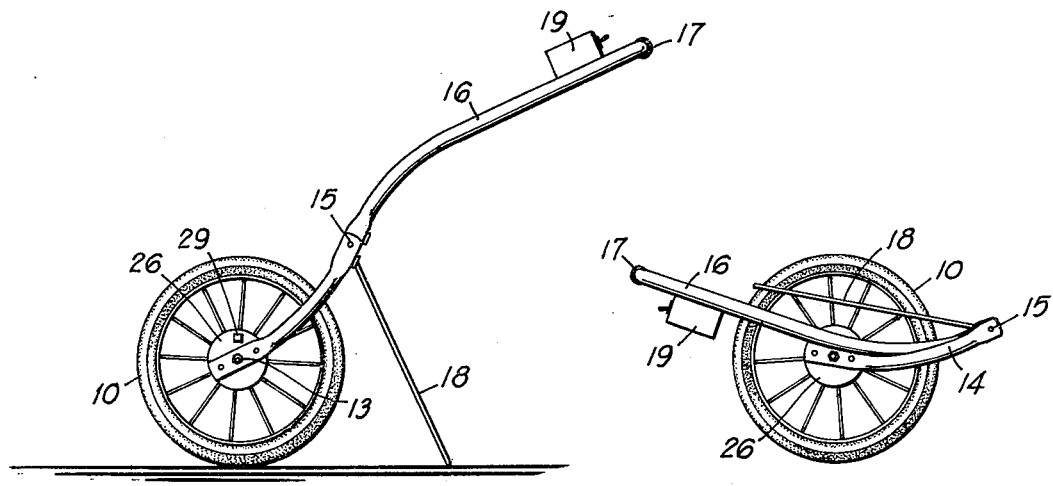
FIG. 5 is a side elevation of the measuring device at rest in the erected state.
FIG. 6 is a similar view of the device collapsed or folded.

Referring to the drawings in detail wherein like numerals designate like parts, a rolling distance measuring device comprises a wheel 10 of predetermined circumference having a hub 11 journaled on a non-rotating axle 12 attached by nuts 13 to the lower ends of arms 14 of a wheel frame. The arms 14 at their tops are hingedly connected through a transverse pivot shaft 15 to an upper preferably U-shaped hand propulsion frame 16 including an upper hand grip 17 by means of which the measuring device can be pushed forwardly over the ground to measure distances. The folding frame of the device is equipped with a folding stand or rest 18 to support the device in the erected state.

Suitably secured to the handle frame 16 is a conventional electrically operated digital counter 19 having an on-off switch 20 and a reset button 21. Preferably, the counter has a conventional liquid crystal display readout 22 on its rearward side. The counter contains conventional circuitry forming no part of the present invention.

Figures 3, 4:
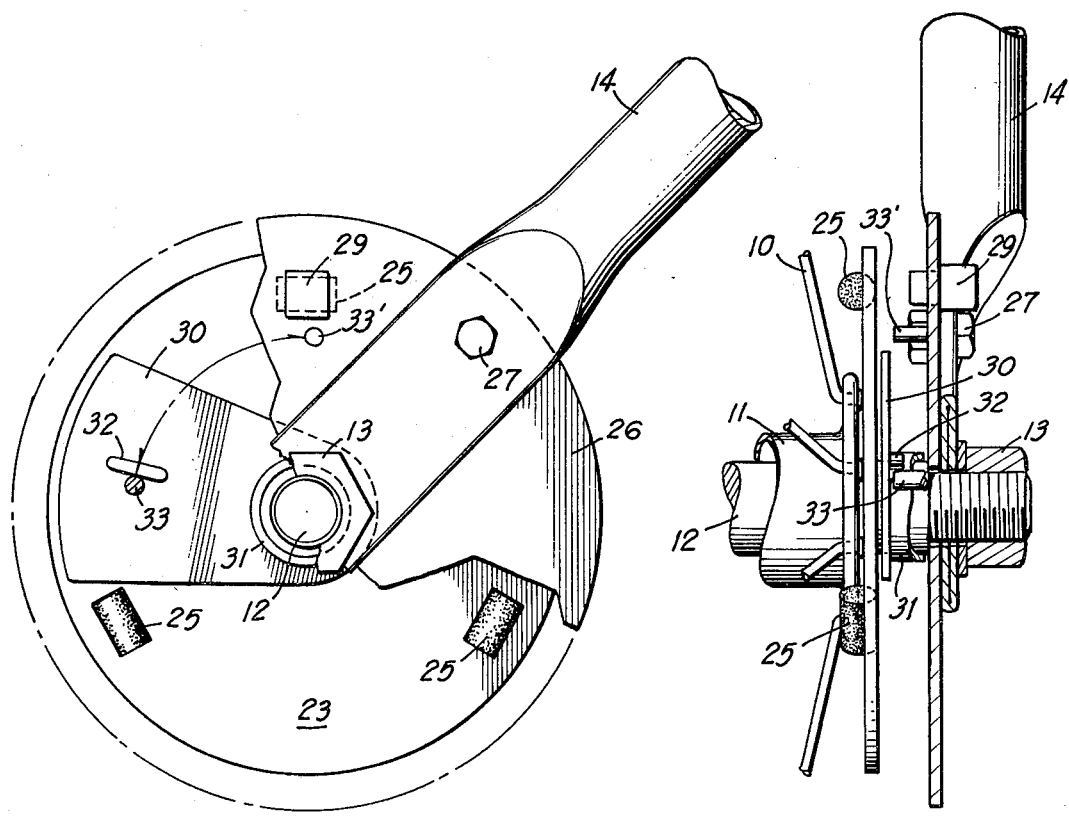
FIG. 3 is a fragmentary side elevation of the hub portion of the measuring device depicting the operation of a magnetic switch shield.
FIG. 4 is a fragmentary vertical section taken on line 4—4 of FIG. 3.

As shown in FIGS. 2, 3 and 4, a magnet carrier disc 23 is attached by fastening means such as screws 24 to the wheel hub 11 to rotate therewith. The disc 23 carries three circumferentially equidistantly spaced permanent magnets 25 fixed thereto. An opposing mounting disc 26 outwardly of the magnet carrying disc 23 is attached by screws 27 to the adjacent wheel frame arm 14, the disc 26 having a central aperture 28 to receive the adjacent end of axle 12. A magnetically operated switch 29, such as a reed switch or any other preferred type, is fixed on the stationary disc 26 at the proper position to be traversed by each of the rotating magnets 25 as the measuring wheel 10 rolls on the ground. When each magnet 25 passes the relatively stationary switch 29 during rotation of the wheel, the switch is actuated to pulse the digital counter 19 in a conventional manner to record the distance traversed by the device and give a visual display of such distance as the measurement progresses. Normally, the device will be pushed forwardly by use of the hand grip 17.

In such forward mode of operation, the magnets 25 will move counterclockwise in FIG. 3. A sector shield 30 or plate of paramagnetic material is disposed between the two discs 23 and 26 with its hub sleeve 31 freely rotatably mounted on the axle 12. On its outer face, the shield carries a fixed locator lug 32. A pair of coacting circumferentially spaced stop pins 33 and 33' are fixed on the disc 26 and project inwardly thereof in the path of rotation of the lug 32 when the shield 30 turns on the axis of its hub 31. The shield 30 is sufficiently long radially to extend between the magnets 25 and magnetic switch 29 to shield the latter from the action of the magnets.

When the measuring device is rolled forwardly, the shield 30 will be magnetically pulled counterclockwise until its lug 32 engages fixed stop pin 33 to prevent further rotation of the shield. The shield 30 is now away from the magnetic switch 29 enabling the latter to be activated by each rotating magnet 25 to pulse the counter 19 during the measuring operation. If the device is pulled rearwardly by the user, the shield 30 will be turned by magnetic attraction clockwise in FIG. 3 until its lug 32 engages stop pin 33', at which point the shield is held between the switch 29 and rotating magnet 25, thus disabling the switch and preventing it from pulsing the digital counter during reverse movement of the device.

Should it be desired to use the device in a reverse mode as by pulling on the handle 17, it is merely necessary to tape or otherwise hold the shield 30 in the switch exposing position against the pin 33, FIG. 3.

As shown in FIG. 1A, an optional vehicular bumper hitch 34 may be utilized on the handle frame 16 when it is desired to propel the measuring device by means of a vehicle.

FIG. 6 shows the device compactly folded on the hinge element 15 with handle frame 16 straddling the wheel 10 together with the folded stand 18 and both of these elements above the wheel frame 14 for a very compact arrangement.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A distance measuring device comprising a wheel, a frame connected to the wheel to facilitate propelling the wheel over a surface, an electrically operated distance recorder on the frame, a relatively stationary magnetically operated switch connected with the frame and electrically coupled with said recorder, at least a permanent magnet connected with the wheel to rotate therewith and positioned to traverse said switch in a circular path of movement to cyclically activate the switch, the switch in turn activating said recorder, and a switch shielding element disposed between the switch and said magnet and being rotatably connected to said frame, the shield being driven in rotation by magnetic attraction, and cooperative stop means on the shield and connected with said frame to position the shield in active shielding relationship to the switch in response to propelling the device in one direction and to position the shield in an inactive non-shielding position relative to the switch responsive to propelling said device in an opposite direction.

2. A distance measuring device as defined in claim 1, and a rotary disc coupled with the hub of said wheel carrying said magnets, and an opposing disc coupled with one side of said frame carrying said switch and being spaced from the first-named disc, and said shield comprising a paramagnetic plate between said discs and freely rotatably mounted on the axle of said wheel and having a locator element projecting from one face thereof, and a pair of circumferentially spaced fixed stop elements on said opposing disc in the path of movement of said locator element.

3. A distance measuring device as defined in claim 1, and a plurality of circumferentially equidistantly spaced permanent magnets on a common support disc attached to said wheel and a spaced opposing support disc for said switch attached to said frame with said shield arranged between said discs, and said cooperative stop means comprising a single stop lug on said shield and a pair of circumferentially spaced stop elements on said opposing support disc in the path of travel of said single stop lug.

4. A distance measuring device as defined in claim 3, and said shield comprising a sector-like plate element of magnetically attractable material.

* * * * *